United States Patent [19]

Takeuchi et al.

[11] Patent Number: 4,819,087
[45] Date of Patent: Apr. 4, 1989

[54] SYSTEM FOR PRECISELY EDITING AUDIO SIGNALS ON A VIDEOTAPE

[75] Inventors: Hajime Takeuchi, Yokohama; Katsuichi Tachi, Ebina, both of Japan

[73] Assignee: Sony Corporation, Tokyo, Japan

[21] Appl. No.: 341,282

[22] Filed: Jan. 21, 1982

[30] Foreign Application Priority Data

Jan. 22, 1981 [JP] Japan .................................. 56-8207

[51] Int. Cl.[4] .......................................... G11B 27/02
[52] U.S. Cl. .................................... 360/14.3; 360/13
[58] Field of Search .................. 360/13, 14.1-14.3, 360/72.1-72.3, 66, 137

[56] References Cited

U.S. PATENT DOCUMENTS

| | | | |
|---|---|---|---|
| 3,257,504 | 6/1966 | Bounsall | 360/14.1 |
| 3,978,521 | 8/1976 | Langer et al. | 360/14.1 |
| 4,115,819 | 9/1978 | Shigeta | 360/14.1 |
| 4,214,278 | 7/1980 | Hunt et al. | 360/14.1 |
| 4,249,218 | 2/1981 | Davis et al. | 360/13 |
| 4,363,048 | 12/1982 | Tanaka et al. | 360/137 |
| 4,363,049 | 12/1982 | Ohtuki et al. | 360/13 |
| 4,365,313 | 12/1982 | Menezes et al. | 360/14.3 X |

FOREIGN PATENT DOCUMENTS

0057086 4/1982 European Pat. Off. .

OTHER PUBLICATIONS

"A Flexible Digital Sound Editing Program for Microcomputer Systems"; Griffiths et al, J. Audio Engr. Soc., vol. 30, No. 3, Mar. 1982.
"Videotape Editing Systems Using Microprocessors"; Hamalainen, SMPTE Journal, vol. 87, No. 6, pp. 379-382, Jun. 1978.
"Sypher: Videotape Sound Post Dubbing"; Eadon, SMPTE Journal, vol. 87, pp. 504-507, Aug. 1978.
"Applying the SMPTE Tone and Control Code to Television Audio Post Production"; Swetland, SMPTE Journal, Aug. 1978.

*Primary Examiner*—Aristotelis M. Psitos
*Attorney, Agent, or Firm*—Lewis H. Eslinger; Jay H. Maioli

[57] ABSTRACT

An editing system for audio signals recorded on magnetic tape comprises a helical scan video tape recorder including a circuit for recording and reproducing the audio signals longitudinally on the magnetic tape, an address signal reproducing circuit for reproducing an address signal recorded on the tape, a tape transporting mechanism for moving the tape, a mode selecting circuit for selecting an operating mode of the video tape recorder, and a circuit for generating pulse signals corresponding to a moving speed of the tape; a monitor circuit for monitoring the audio signals reproduced by the video tape recorder; and an editing control circuit including a speed control circuit for controlling the tape transport mechanism to change the speed of the tape and thereby locate an editing point on the tape, an address signal reading circuit for reading the address signal supplied from the video tape recorder, a counting circuit for counting the pulse signals, a memory for storing output signals from the reading circuit and the counting circuit which are generated when the tape is positioned at the editing point, and a controller circuit for controlling the mode selecting circuit in response to the output signals stored in the memory.

12 Claims, 2 Drawing Sheets

SYSTEM FOR PRECISELY EDITING AUDIO SIGNALS ON A VIDEOTAPE

BACKGROUND OF THE INVENTION

1. Field of the Invention

The present invention relates to editing systems for audio signals, and more particularly, to an editing system for audio signals which can edit and change audio signals with closely spaced timing signals.

2. Description of the Prior Art

In a conventional editing system or editor wherein video and audio signals are edited and then recorded on a record medium, hour, minute and second frame signals are generally provided and correspond with frame signals of the video signals. One standard for time code signals is the SMPTE (Society of Motion Picture and Television Engineers) time code signals which can be utilized as address signals. Since the SMPTE time code signals correspond to the frame signals of the video signals, they are quite effective when the video signals, which can change in only whole unit frames, are edited. However, SMPTE time code signals are unsatisfactory for editing audio signals, and signals having finer (more closely spaced) divisions are required. In a conventional editor, the editing is carried out based on the SMPTE time code signal corresponding to the frame signal, so that the editing can not be carried out with a unit having smaller divisions. Further, when an unwanted, previously recorded audio signal is left between the edited signals on the tape fine divisions in the time code signals are required for the editing operation. Since the unwanted audio signal causes a "pop" noise upon playback, it is necessary to erase the unwanted audio signal, in other words, to perform a "spot" erase. But, since the spot erasing must be generally carried out with a unit having close spacing than the frame signal spacing, it is quite difficult automatically to perform the spot erase.

OBJECTS AND SUMMARY OF THE INVENTION

Accordingly, it is an object of the present invention to provide an editing system for audio signals which can edit and change the audio signals using closely spaced divisions.

It is another object of the present invention to provide an editing system for audio signals which can easily perform a spot erase.

According to an aspect of the present invention, there is provided an editing system for audio signals which accurately performs an erase operation for audio signals recorded longitudinally on a tape. A start point for the erase operation is controlled by an address signal produced by a pulse generator mounted on a capstan for moving the tape.

The above, and other objects, features and advantages of the present invention will be apparent from the following detailed description of an illustrative embodiment thereof, which is to be read in connection with the accompanying drawings.

DESCRIPTION OF THE PREFERRED EMBODIMENT

Figure 1:
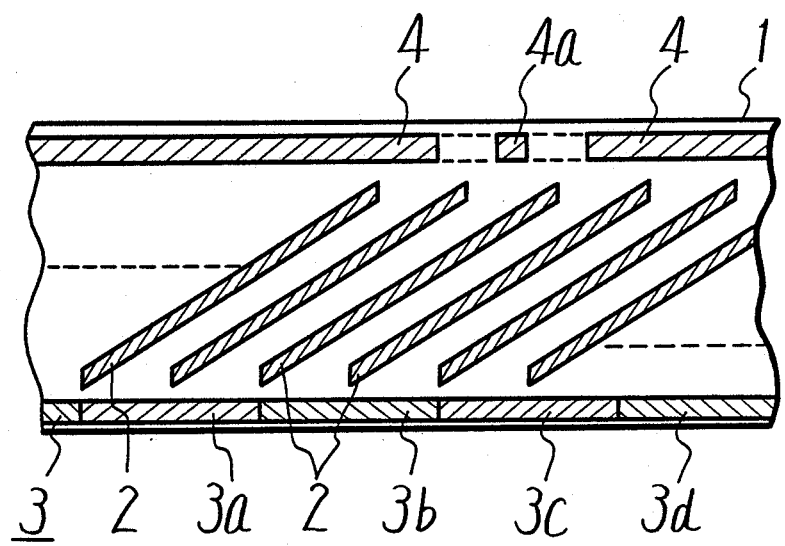
FIG. 1 illustrates the positioning of the recording tracks on a video tape for use with the present invention.

FIG. 1 illustrates the positioning of the recording tracks on a magnetic tape 1 of a helical scan video tape recorder used in an embodiment of the present invention. As illustrated in FIG. 1, reference numeral 2 denotes a video signal track, wherein two video signal tracks comprise one frame. Numeral 3 denotes an address track in which, as shown by numerals 3a, 3b and 3c, the address track is formed by the SMPTE time codes, with each time codes 3c, 3b, 3c corresponding to one frame. Time codes 3a, 3b and 3c are located on tape 1 in response to each one frame signal of corresponding video signal tracks 2. Audio signal tracks in 4 are located on tape 1. An unwanted audio signal track 4a remains at the connected portion between edited audio sigal tracks 4.

Figure 2:
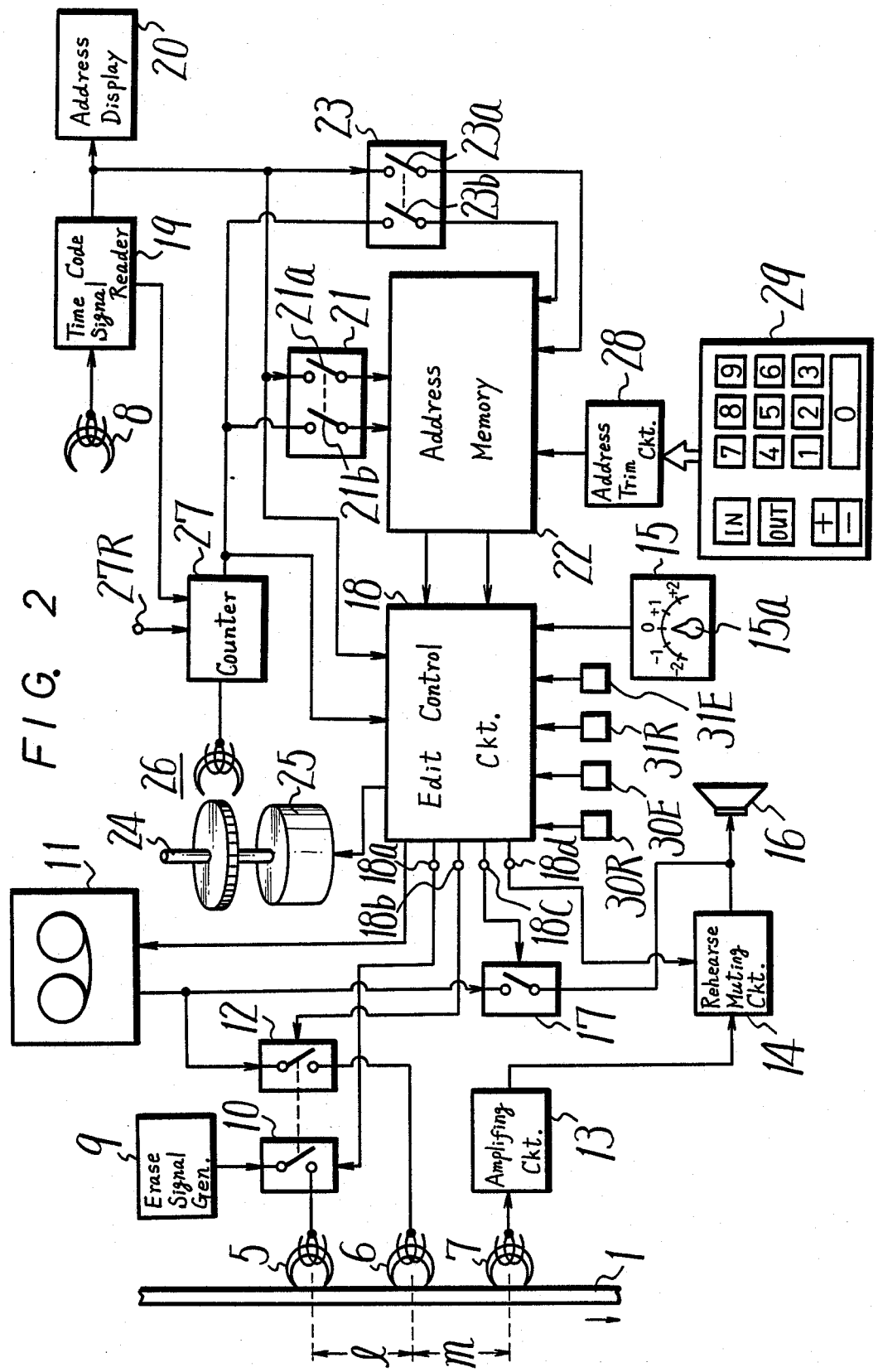
FIG. 2 is a block diagram illustrating one embodiment of an editing system for audio signals according to the present invention.

FIG. 2 illustrates an embodiment of an editing system for audio signals according to the present invention. An erasing magnetic head 5 for erasing the audio signals recorded on audio signal tracks 4 of magnetic tape 1 is provided. Numeral 6 designates a recording magnetic head for recording the audio signals on audio signal tracks 4. Numeral 7 designates a reproducing magnetic head for reproducing the audio signals from audio signal tracks 4. Numeral 8 designates an SMPTE time code signal reproducing magnetic head for reproducing the SMPTE time code signal from SMPTE time code signal track 3.

Erasing head 5 is adapted to perform an erase operation when supplied with an erase signal derived from an erase signal generating circuit 9 and delivered through a connection switch 10 which is controlled by a control signal derived from an edit control circuit 18, more fully described below. As shown in FIG. 2, numeral 11 designates another video tape recorder (hereinafter referred to as a VTR), which is a source for supplying new audio signals etc. to be newly edited. The audio signal derived from VTR 11 is supplied to recording magnetic head 6 through a connection switch 12 which is actuated by a control signal produced from edit control circuit 18 (and described more fully below). The audio signal reproduced from reproducing magnetic head 7 is supplied to a serial circuit comprising an amplifying circuit 13 and a rehearse muting circuit 14 to a speaker 16. Rehearse muting circuit 14 is controlled by a control signal derived from edit control circuit 18, which will be described later, and the spot erasing. The audio signal produced from VTR 11 is supplied to speaker 16 by an editing rehearse connection switch 17. Editing rehearse connection switch 17 is controlled by a control signal derived from edit control circuit 18, as will be described later. The reproduced signal from SMPTE time code signal reproducing magnetic head 8 is supplied to a time code signal reading circuit or reader 19 and the output signal of time code signal reader 19 is supplied to an address display 20 whereby the location of magnetic tape 1 at any moment is displayed by the SMPTE time code signal. The time code signal produced at an output of the time code signal reader 19 is supplied through one connection switch 21a in an in-point (or editing start point) deciding switch 21 to an address memory 22. In addition, the time code signal is supplied through one connection switch 23a is an out-point (or editing stop point) deciding switch 23 to address memory 22. This time code signal is also supplied to edit control circuit 18 as a comparing signal.

A capstan shaft 24 rotates to transport magnetic tape 1. Capstan shaft 24 is constructed in the same manner as one in a conventional VTR, and its rotation is controlled by a capstan motor 25.

In the preferred embodiment of the present invention, capstan shaft 24 is provided with a frequency generator 26. Frequency generator 26 generates pulse signals of a predetermined number, as, for example, 14 pulse signals having equal intervals, with each signal located between the frame signals when magnetic tape 1 is transported at a constant speed. In other words, capstan shaft 24 rotates at a constant speed. In the preferred embodiment, when the time code signal is produced from magnetic tape 1 transported by capstan shaft 24, the number of the pulse signals which frequency generator 26 generates between the frame signals in the time code signal is always a predetermined number, for example, 14, irrespective of the rotation speed of capstan shaft 24. The output pulse signal from frequency generator 26 is supplied to a counter 27 as a count signal. Counter 27 comprises an up-down counter which is incremented in response to when a tape transporting direction signal delivered from time code signal reader 19. Instead of the tape transporting direction signal, is an alternate embodiment, counter 27 may be supplied with a signal derived from a tape speed controller, as described more fully described. A reset signal input terminal 27R receives the frame signal produced from the time code signal on magnetic tape 1 when the frame signal is supplied to counter 27. Counter 27 is reset by the frame signal which is supplied to reset signal input terminal 27R. Accordingly, counter 27 is adapted to count the output pulse signal between frame signals in the reproduced time code signal from the frequency generator 26 irrespective of the tape transporting direction and the tape speed. The count signal produced at the output terminal of counter 27 is supplied through another connection switch 21b of in-point deciding switch 21 to address memory 22. The count signal is also supplied to address memory 22 via another connection switch 23b of out-point deciding switch 23. In addition, the count signal is supplied as a comparing signal to edit control circuit 18. In such a case, connection switches 21a and 21b of in-point deciding switch 21 are simultaneously made ON and OFF. The time code signal and the count signal at the time when connection switches 21a and 21b are made ON are stored in address memory 22 as an editing start point time information signal which is supplied to edit control circuit 18. Also, connection switches 23a and 23b in out-point deciding switch 23 are arranged so that they are made ON and OFF simultaneously. The time code signal and the count signal at the time when connection switches 23a and 23b are made ON are supplied to and stored in address memory 22 as an editing end time information signal. The editing end time information signal thus stored in address memory 22 is supplied to edit control circuit 18. An address trim circuit 28 includes an arithmetic function for supplying an address trim signal to address memory 22 in accordance with the operations of a keyboard 29, thereby allowing the editing start-and-end time information signals to be "trimmed" or corrected. Keyboard 29 is provided with ten digit or numerical keys along with "IN" "OUT", "+" and "−" keys, in the illustrated embodiment. The outputs therefrom are supplied to address trim circuit 28. When the address for the in-point is to be trimmed, the "IN" key on keyboard 29 is depressed and if necessary, "+" or "−" key and one or more numerical keys is depressed in response to the desired amount of trimming, so that address trim circuit 28 operates to change the in-point address which is stored in address memory 22. In this case, since trimming using the ten digit or numerical keys is carried out in a unit responsive to the input pulse of counter 27, if trimming is performed along with confirmation by the rehearse operation as described later, it is possible to determine an accurate edit point for the address.

An audio rehearse button 30R, an audio edit button 30E, a spot erase rehearse button 31R and a spot erase button 31E generate output signals while are supplied to edit control circuit 18. When audio rehearse button 30R, audio edit button 30E, spot erase rehearse button 31R and spot erase button 31E are respectively operated, edit control circuit 18 is activated by a computer included therein to control the audio rehearse operation, the audio edit operation, the spot erase rehearse operation and the spot erase operation, respectively. A tape speed controller 15 includes a potentiometer adjusted by rotation of a knob 15a. The output therefrom is supplied to edit control circuit 18, by which the direction of rotation and the speed of capstan motor 25 or a capstan motor (not shown) of VTR 11 are controlled. When knob 15a in tape speed controller 15 is positioned at its center, capstan motor 25 is stopped. When it is rotated in a clockwise direction, capstan motor 25 rotates in the normal direction and its rotational speed is increased in accordance with the rotation angle. In the case of a counter-clockwise direction, although capstan motor 25 rotated in a reverse direction, the rotational speed is also increased in response to the rotation angle.

In the figure, the rotation speed can be controlled in a range from +(plus) two times normal play speed to −(minus) two times normal play speed. While there are provided various kinds of function keys on keyboard 29 used for the ordinary editing of the video signal that control edit control circuit 18, these functon keys are not shown in the figure because they are not pertinent for a complete understanding of the editing system for audio signals in accord with the embodiment according to the present invention.

A description of the operation of the illustrated embodiment of the present invention will first be given to illustrate a spot erase of an unwanted audio signal track 4a, as seen in FIG. 1.

Since track 4a is short in length, it is quite difficult to determine the position of track 4a if tape 1 is transported at the normal speed. Therefore, knob 15a of tape speed controller 15 is adjusted so that the rotation speed of capstan motor 25 is slower than the normal speed. While the reproduced signal from magnetic head 7 in the low speed mode is monitored through speaker 16, the start point of track 4a is searched, and then tape 1 is stopped. When track 4a or its start point is not identified as hereinbefore described, the start point of track 4a can be searched whereby tape 1 is transported in the normal and reverse directions before and after the start point. After tape 1 is stopped at the start point of track 4a, holding this state of tape 1, the in-point deciding switch 21 is operated to supply the SMPTE time code signal produced at the output terminal of time code signal reader 19 and the count signal produced at the output terminal of counter 27 to address memory 22 is stored as the erase start time information signal.

In a like manner, tape 1 is stopped at the end point of track 4a and out-point deciding switch 23 is activated to supply the SMPTE time code signal produced at the output terminal of time code signal reader 19 and the count signal produced at the output terminal of counter 27 to address memory 22 where it is stored as the erase end time information signal.

With respect to the operations of in-point deciding switch 21 and out-point deciding switch 23, switches 21 and 23 can also be operated while tape 1 is being transported and the values of time code signal reader 19 and counter 27, which are produced at the instant the switch buttons are depressed, are stored in address memory 22. In such an operation, however, a "reaction trim" is required to be performed because there is a natural reaction time delay before an operator depresses the switch button after hearing the sound. The reaction trim is performed as follows. After "IN" or "OUT" and "+" or "−" buttons on the keyboard 29 are operated, numerals responsive to the reaction delay time of the operator are inputted by the ten digit or numerical keys whereby the address of address memory 22 can be trimmed or corrected by address trim circuit 28.

In this way, the start and end points of the unwanted track 4a are determined. However, if the erase operation is carried out by the embodiment as described above, there is a possibility that other parts of the audio track excluding the unwanted track 4a will be erased. In order to avoid an unwanted ensure, a rehearse operation is preferably performed to confirm the accuracy of the editing operation.

When spot erase rehearse button 31R is depressed, edit control circuit 18 sequentially carries out the following commands. First, magnetic tape 1 is rewound from the in-point address previously determined to a position located a predetermined distance therebefore, namely, a preroll is performed. After the preroll, tape 1 is transported at the normal speed and, at the same time, the audio signal recorded thereon is reproduced. Edit control circuit 18 compares the SMPTE time code signal produced at the output terminal of time code reader 19 derived from magnetic and the count signal produced at the output terminal of counter 27 with the erase start time information signal stored in address memory 22. When these signals coincide with each other, edit control circuit 18 produces a muting control signal at its muting control signal output terminal 18d which is then supplied to rehearse muting circuit 14 whereby the audio signal supplied to speaker 16 is muted. Next, edit control circuit 18 compares the SMPTE time code signal derived from time code signal reader 19 and the count signal from counter 27 with the erase end time information signal stored in address memory 22. When these signals coincide, edit control circuit 18 cuts off the muting control signal supplied at muting control signal output terminal 18d, so that the muting operation of muting circuit 14 is released to allow the audio signal to be supplied to speaker 16. Accordingly, the spot erase rehearse operation mute the sound at the part which is to be erased.

If it becomes clear through the rehearse operation that the in-point and/or out-point is unsuitable, keyboard 29 is operated in the manner described with reference to the reaction trim to change the addresses thereof, thus permitting the rehearse operation to be performed again. When the portion that is to be erased is determined as being satisfactory by the spot erase rehearse operation, spot erase button 31E is operated and edit control circuit 18 operates as hereinbefore described. Since there are some differences such as distance m between reproducing head 7 and recording head 6 and distance l between recording head 6 and erase head 5, as seen in FIG. 2, upon erasing, the erase operation must be performed with a timing correction to correct for such differences. The difference among the erase start time information signal derived from the address recording apparatus or address memory 22, the SMPTE time code signal from time code signal reader 19 and the count signal derived from counter 27 is equal to the distance l+m. The erase control signal is generated by edit control circuit 18 and supplied to erase control signal output terminal 18a, so that connection switch 10 is closed by the erase control signal to supply the erase signal derived from the erase signal generator or generating circuit 9 to erase head 5 thereby to place erase head 5 in the erasing mode. Erase head remains in the erasing mode until the difference among the erase end time information signal stored in address memory 22, the SMPTE time code signal read out from time code signal reader 19 and the count signal derived from counter 27 is equal to the distance l+m, so that the spot erase operation is performed. In this case, since the count signal derived from counter 27 is used in addition to the SMPTE time code signal, which is the frame signal, to determine the erase start time and the erase end time, the erase start time and the erase end time of the erase operation can be determined in finer units than the SMPTE time code signals so that a spot erase of the unwanted audio signal can be performed by an automatic operation. Accordingly, a spot erase can be easily performed.

A description will next be given for an edit, where signals are partially inserted in the audio tracks, especially when the editing is carried out.

In such an insert edit, the edit start time and the edit end time are determined in the same manner as described above and the edit start-and-end time information signals are stored in address memory 22.

Also, with respect to VTR 11, the edit start-and-end time information signals are stored in address memory 22 by similar operations, where in this case, only the in-point is stored.

When the audio rehearse operation is carried out for the audio signal prior to the editing, the audio signal rehearse button 30R is operated.

In this case, edit control circuit 18 generates a command to VTR 11 during the preroll of magnetic tape 1, so that magnetic tape 1 and VTR 11 are started in the play mode after the preroll is performed. Next, the edit control circuit 18 compares the SMPTE time code signal produced at the output terminal of time code signal reader 19 from magnetic tape 1 and the count signal produced at the output terminal of counter 27 with the edit start time information signal stored in address memory 22. When these signals coincide, the muting control signal is produced at muting control signal output terminal 18d of edit control circuit 18 and then delivered to muting circuit 14 to perform the muting operation. At the same time, edit control circuit 18 produces an audio rehearse control signal at audio rehearse control signal output terminal 18c whereby connection switch 17 is closed by the audio rehearse control signal to supply the audio signal derived from VTR 11 to speaker 16. The audio rehearse mode lasts from the edit start time to the edit end time. When the SMPTE time code signal derived from time code reader 19, the count signal from counter 27 and the edit end time information signal stored in address memory 22 coincide, the respective control signals are terminated at control signal output terminals 18c and 18d, so that connection switch 17 is made OFF and the muting operation of muting circuit 14 is terminated. In other words, in accordance with the audio rehearse operation as hereinbefore described, the reproduced signal from reproducing head 7 is supplied to speaker 16 upon normal mode while the audio signal derived from VTR 11, which will be inserted thereinto, is supplied to speaker 16 between the edit start-and-end times so that the state of tape 1 after the editing is completed can be ascertained from the sound speaker 16 reproduces.

If it is determined from the rehearse operation that the edit points stored in address memory 22 as inaccurate, a trim operation can be performed as described above. If the edited state of tape 1 is satisfactory as determined by the audio rehearse operation, audio edit button 30E is depressed to activate edit control circuit 18 in the same manner same as described for the audio rehearse mode. But, as described above, since respective heads 5, 6 and 7 have distance differences thereamong, switch 10 is controlled to be turned ON sooner than the stored address would otherwise indicate by the amount of l+m, and switch 12 is controlled to be made ON sooner than the stored address would otherwise indicate by the amount of m. In a like manner, switches 10 and 12 are controlled to be made OFF sooner than the stored address would otherwise indicate by like amounts, respectively, so that the insert edit is accurately performed.

In this case, since the count signal derived from counter 27 is used in addition to the SMPTE time code signal, which is the frame signal, in order to determine the edit start-and-end times as for a spot erase, it is possible to decide the edit start-and-end times with a finer unit of time than the SMPTE time code signal and hence, the editing of the tape can be performed with finer units or divisions.

While an insert edit is described above, the editing system for audio signals according to the present invention can also be applied to an assemble edit where two signals are simply connected together.

As described above, in accord with the embodiment of the present invention, the count signal is derived from counter 27, i.e., the address signal is prepared between the SMPTE time code signals which are also the frame signals, and the frame and address signals are utilized to edit the audio signal, so that the audio signal can be edited and corrected with a finer unit than the SMPTE time code signal and therefore, a spot erase can be easily performed. Also, according to the embodiment of the present invention, since the address signal between the frame signals is obtained from frequency generator 26 provided in connection with capstan shaft 24, it is possible to derive an address signal with a predetermined interval relative to magnetic tape 1 which is independent of the transportation speed of magnetic tape 1. Consequently, although tape 1 is transported at a low speed, the address for address memory 22 is determined so that there is little influence from the reaction delay of the operator, so that the address can be determined more quickly than in prior art editors.

In the above-described embodiment of the present invention, frequency generator 26 is provided in association with capstan shaft 24 to determine the address signal between the frame signals, rather than frequency generator 26. Such a modification may also be made in which a pulse generator is provided with a counter roller having a rotary shaft rotated by the feeding of the tape.

While the described embodiment of the present invention utilizes the SMPTE signal as the time code signal, another time code signal, such as VITC (Video Intermediate Time Code) signal can be used. Accordingly, the time code signal is recorded during one horizontal blanking period of the video signal, as disclosed in U.S. Pat. No. 4,159,480 issued on June 26, 1979.

Although a specific embodiment of the present invention has been described in detail herein with reference to the accompanying drawings, it is to be understood that the invention is not limited to that precise embodiment, and that various modifications may be effected therein by one skilled in the art without departing from the spirit and scope of the invention as defined in the appended claims.

What is claimed is:

1. An editing system for audio signals recorded on magnetic tape comprising:
   a helical scan videotape recorder including means for recording and reproducing said audio signals longitudinally on said magnetic tape, address signal reproducing means for reproducing address signals recorded on said tape at predetermined intervals, tape transporting means for moving said tape, mode selecting means for selecting an operating mode of said videotape recorder, and means receiving said address signals reproduced by said address signal reproducing means for generating pulse signals corresponding to a moving speed of said tape and occuring in synchronism with the reproduced address signals at a frequency higher than the frequency of said address signals as reproduced by said reproducing means, whereby said pulse signals represent finer divisions of said tape than said predetermined intervals;
   monitor means for monitoring said audio signals reproduced by said videotape recorder; and
   editing control means including speed control means for controlling said tape transport means to change said speed of said tape, address signal reading means for reading said address signals reproduced by said videotape recorder, counting means for counting said pulse signals, memory means for storing output signals from said reading means and said counting means, and controller means responsive to said output signals stored in said memory means for controlling said mode selecting means and said tape transport means to locate precisely an editing point on said tape as defined by one of said finer divisions of said tape.

2. The editing system for audio signals of claim 1, wherein said controller means includes said address signal reading means and means for comparing output signals produced by said counting means with said output signals stored in said memory means.

3. The editing system for audio signals of claim 1, wherein said controller means further includes second memory means for storing second output signals supplied by said reading means and said counting means when said tape is positioned at a second editing point.

4. The editing system for audio signals of claim 3, wherein said controller means controls said mode selecting means in response to outputs from said second memory means.

5. The editing system for audio signals of claim 1, wherein said video tape recorder includes erasing means for erasing audio signals recorded on said tape and wherein said selecting means actuates said erasing means in response to said output signals stored in said memory means.

6. The editing system for audio signals of claim 1, wherein said address signal reproducing means includes a magnetic head for reproducing said address signal recorded in said longitudinal direction of said tape.

7. The editing system for audio signals of claim 1, wherein said video tape recorder includes a reproducing rotary magnetic head for reproducing a video signal recorded on said tape and said address signal reproducing means includes means for filtering said address signal from said video signal reproduced by said rotary magnetic head.

8. The editing system for audio signals of claim 1, wherein said editing control means includes manual switch means for supplying said output signals generated by said reading means and said counting means to said memory means.

9. The editing system for audio signals of claim 1, wherein said editing control means includes means for disabling said monitor means in response to signals stored in said memory means.

10. The editing system for audio signals of claim 1, wherein said editing control means includes means for adjusting said signals stored in said memory means in response to signals from a keyboard.

11. The editing system for audio signals of claim 1, wherein said tape transport means is a pulse generator associated with said capstan.

12. The editing system for audio signals of claim 1, wherein said pulse signal generating means comprises rotation means rotated by said movement of said tape, and a pulse generator associated therewith.

* * * * *